US009495788B2

United States Patent
Kim et al.

(10) Patent No.: US 9,495,788 B2
(45) Date of Patent: Nov. 15, 2016

(54) APPARATUS AND METHOD FOR DEVELOPING ROBOT CONTENTS

(71) Applicant: KT CORPORATION, Seongnam (KR)

(72) Inventors: Jong-Cheol Kim, Seoul (KR); Sung-Taek Jung, Yongin-si (KR); Mi-Jeong Hong, Seoul (KR)

(73) Assignee: KT Corporation, Seongnam (KR)

( * ) Notice: Subject to any disclaimer, the term of this patent is extended or adjusted under 35 U.S.C. 154(b) by 86 days.

(21) Appl. No.: 14/039,942

(22) Filed: Sep. 27, 2013

(65) Prior Publication Data

US 2014/0285482 A1  Sep. 25, 2014

(30) Foreign Application Priority Data

Mar. 22, 2013  (KR) .................. 10-2013-0030897
May 21, 2013  (KR) .................. 10-2013-0057176

(51) Int. Cl.
*G06T 15/00* (2011.01)
*G06T 13/40* (2011.01)

(52) U.S. Cl.
CPC ........... *G06T 13/40* (2013.01); *G06T 2200/24* (2013.01)

(58) Field of Classification Search
CPC ................ B25J 9/1671; G06T 2200/24; G06T 13/40
USPC ................ 345/418, 419; 700/245, 247, 250; 715/700, 771
See application file for complete search history.

(56) References Cited

U.S. PATENT DOCUMENTS

| | | | |
|---|---|---|---|
| 5,046,022 A * | 9/1991 | Conway et al. | ............. 700/250 |
| 6,718,231 B2 | 4/2004 | Konno et al. | |
| 7,753,145 B2 * | 7/2010 | Hillis | ................... B62D 57/022 180/8.1 |
| 7,930,643 B2 * | 4/2011 | Chandhoke et al. | ......... 715/771 |
| 8,272,466 B2 * | 9/2012 | Moriguchi | ............... B25J 5/007 180/167 |
| 8,332,067 B2 * | 12/2012 | Ditscher | ............... B25J 9/1671 700/245 |

(Continued)

FOREIGN PATENT DOCUMENTS

JP   2008254074 A   10/2008
KR  2002-0056949 A   7/2002

(Continued)

OTHER PUBLICATIONS

Chen et al, An RTM Based Distributed Simulation System for Guide Robot, Digital Manufacturing and Automation (ICDMA), 2013 Fourth International Conference on Jun. 2013, pp. 185-189, DOI: 10.1109/ICDMA.2013.43.*

(Continued)

*Primary Examiner* — Phu K Nguyen

(74) *Attorney, Agent, or Firm* — Sughrue Mion, PLLC

(57) ABSTRACT

An apparatus and method for developing contents which may direct motions of a robot according to time and synchronize motions of a robot with a media. The apparatus for developing robot contents outputs an interface including an editing area and a motion event track and includes a drawer configured to implement and provide a three-dimensional robot model in the editing area, and a motion editor which generates a robot motion event according to a motional manipulation with respect to the robot model of the editing area and providing the robot motion event on the motion event track according to time.

33 Claims, 13 Drawing Sheets

(56) References Cited

U.S. PATENT DOCUMENTS

| | | | |
|---|---|---|---|
| 8,353,767 B1* | 1/2013 | Borst | A63F 13/12 |
| | | | 463/31 |
| 8,447,428 B2* | 5/2013 | Maisonnier et al. | 700/245 |
| 8,452,447 B2* | 5/2013 | Nixon | 700/245 |
| 8,560,118 B2* | 10/2013 | Greer et al. | 700/247 |
| 8,640,027 B2* | 1/2014 | Chandhoke et al. | 715/700 |
| 8,666,544 B2* | 3/2014 | Moll et al. | 700/245 |
| 9,002,520 B2* | 4/2015 | Hong | B25J 9/1689 |
| | | | 318/568.25 |
| 9,067,315 B2* | 6/2015 | Kawamoto | B25J 13/08 |
| 9,080,886 B1* | 7/2015 | Lacaze | G08B 1/08 |
| 9,131,986 B2* | 9/2015 | Greer | A61B 19/201 |

FOREIGN PATENT DOCUMENTS

| | | |
|---|---|---|
| KR | 10-2005-0031525 A | 4/2005 |
| KR | 10-0738258 B1 | 7/2007 |

OTHER PUBLICATIONS

Faust et al, A Video Game-Based Mobile Robot Simulation Environment, Intelligent Robots and Systems, 2006 IEEE/RSJ International Conference on Year: 2006, pp. 3749-3754, DOI: 10.1109/IROS.2006.281757.*

* cited by examiner

APPARATUS AND METHOD FOR DEVELOPING ROBOT CONTENTS

CROSS-REFERENCE TO RELATED APPLICATION

This application claims the benefit of priority from Korean Patent Applications No. 10-2013-0030897, filed on Mar. 22, 2013 and No. 10-2013-0057176, filed on May 21, 2013 in the Korean Intellectual Property Office, the disclosure of which is incorporated herein by reference in its entirety.

BACKGROUND

1. Field

Exemplary embodiments relate to an apparatus and a method for developing contents capable of controlling a robot, and more particularly, to an apparatus and a method for developing contents which may direct motions of a robot according to time and synchronize motions of a robot with a media.

2. Description of the Related Art

Generally, in most existing robot control methods, a developer develops a program, directly executes the program in a robot, finds errors from the execution result, and debugs the program several times. In addition, it is also not easy to associate and synchronize actual motions of a robot with a displayed image.

Due to such technical limitations, it is difficult to commercialize a robot which may give various contents useful for real life. In addition, since different platforms or components should be controlled for various robots, a development tool or content designed for controlling a specific robot may not be applied to a different kind of robot.

For example, a robot designed at an early stage has no arm and thus it is not needed to control an arm. However, an arm is added to a robot designed at a next stage and should be controlled. Therefore, a development tool designed in the early stage cannot use the added function. For this reason, whenever a new robot is designed, a new development tool and content for the new robot should also be designed.

In addition, a face recognition function, a conversation function, a navigation function, a user staring function or the like, specialized only for a robot, may not be easily applied to contents, which gives a limit in developing contents differentiated from contents designed for a personal computer (PC). In order to design distinctive contents for a robot, it is needed to apply robot-related development techniques to contents.

Recently, a robot for providing educational content service has been developed. This intelligent service robot has an appearance similar to a human, which allows natural conversation and interchange of feeling through a screen and a face LED. In addition, a state of a student may be recognized by means of a voice or sensors to give a reaction or stimulation required for an individual student, which may promote operant learning.

Such a robot may be a robot teacher or a friend which coexists and cooperates with an infant, beyond an existing instrumental teaching medium concept. Such an intelligent service robot also adopts an open architecture such as an Android operating system. Therefore, many general developers may participate in development of applications for the intelligent service robot. However, as described above, the intelligent service robot may move by itself, differently from a mobile terminal, may evade while autonomously traveling, may adopt sensors for the evading function, and various kinds of hardware such as touch sensors and LED at various portions in order to give the sensitivity service.

Therefore, there is demanded an environment in which contents capable of utilizing and controlling hardware resources of such an intelligent service robot may be freely developed.

SUMMARY

Exemplary embodiments are designed to solve the problems of the related art, and therefore exemplary embodiments are directed to providing an apparatus and a method for developing robot contents, which may allow a user of a robot to develop contents for the robot without any programming work so that hardware resources of the robot may be utilized and controlled by the contents.

Illustrative, non-limiting embodiments may overcome the above disadvantages and other disadvantages not described above. The present invention is not necessarily required to overcome any of the disadvantages described above, and the illustrative, non-limiting embodiments may not overcome any of the problems described above. The appended claims should be consulted to ascertain the true scope of the invention.

According to an aspect of exemplary embodiments, there is provided an apparatus for developing robot contents. The apparatus includes a drawer configured to implement and express a three-dimensional robot model in an editing area of an interface for developing the robot contents; and a motion editor configured to generate a robot motion event according to a motional manipulation with respect to the robot model of the editing area and configured to provide the robot motion event at a motion event track of the interface according to time.

The motion editor may calculate a head motion angle according to a manipulation with respect to a head of the robot model, receive an actuation time from a user, and provide a head motion event rod including information about the head motion angle and about a length corresponding to the actuation time provided on the motion event track.

The motion editor may display a reference line according to a location of the robot model and a sight line of the robot model, and calculate an angle between the sight line and the reference line as a head motion angle.

The motion editor may display an indicator at a neck-hinge portion of the robot model, and display the reference line and the sight line when the indicator is selectively input.

The motion editor may change an image in the editing area into a perspective view when the head motion editing mode is in operation.

The motion editor may change an image of the editing area into a top view when a movement motion editing mode is in operation, and display two indicators associated with movement motion editing at the robot model of the editing area.

Any one of the two indicators may be a front/rear movement motion editing indicator and the other one may be a rotating motion editing indicator.

When the front/rear movement motion editing indicator is selected, the motion editor may calculate a moving distance according to a manipulation with respect to front/rear movement of the robot model, may receive a movement speed from the user, and may provide a movement motion event rod including information about the moving distance and about a length corresponding to the movement time provided on the motion event track.

The motion editor may display a before-movement location line and an after-movement location line of the robot model in the editing area, and display a moving distance therebetween.

When the rotating motion editing indicator is selected, the motion editor may calculate a rotation angle according to a manipulation with respect to rotation of the robot model, may receive a rotation speed from the user, and may provide a movement motion event rod including information about the rotation angle and about a length corresponding to the rotation time at the motion event track.

The motion editor may display a before-rotation sight line and an after-rotation sight line of the robot model in the editing area, and may display a rotation angle therebetween.

The motion editor may display a before-rotation sight line and an after-rotation sight line of the robot model in the editing area, and may display a rotation angle therebetween.

The motion editor may receive a selective input about the lamp location and color and time of the lamp, and provide a lamp expression event rod including information about the lamp location and the color and about a length corresponding to the received time provided on the motion event track.

The apparatus for developing robot contents may further include a motion regenerator configured to operate the robot model of the editing area according to an event provided on the motion event track; and a synchronizer configured to communicate with a tangible robot and configured to synchronize operation of the robot model with the tangible robot.

In a content editing mode, the editing area may be shifted into an emulation area in which the robot model operates only in a virtual space, a preview window for outputting a media may be displayed, and the motion event track may be shifted into a content event track. Here, the apparatus may further includes a template manager which stores a template of a robot motion event generated by the motion editor and a media template and providing a list thereof; and a content developer configured to provide a robot motion event and a media selected from the list provided by the template manager as an event rod having a length corresponding to a regeneration length of the corresponding robot motion event and media and providing the event rod at the content event track.

When receiving a regeneration input, the content developer may operate the robot model of the emulation area according to the robot motion event provided on the content event track, regenerate the media provided on the content event track, and output the media to the preview window.

In another aspect of exemplary embodiments, there is also provided a method for developing robot contents in a robot content developing apparatus. The method includes outputting an interface including an editing area and a motion event track; implementing and expressing a three-dimensional robot model in the editing area; and generating a robot motion event according to a motional manipulation with respect to a robot model of the editing area and providing the robot motion event at the motion event track according to time.

The providing the robot motion event may include calculating a head motion angle according to a manipulation with respect to a head of the robot model and receiving an actuation time; and providing a head motion event rod including information about the head motion angle and about a length corresponding to the actuation time provided on the motion event track.

The receiving the actuation time may include displaying a reference line according to a location of the robot model and a sight line of the robot model; and calculating an angle between the sight line and the reference line as a head motion angle.

The displaying the reference line may include displaying an indicator at a neck-hinge portion of the robot model; and displaying the reference line and the sight line when the indicator is selectively input.

The method may further include changing an image of the editing area into a perspective view.

After the implementing and providing the three-dimensional robot model, the method may further include changing an image of the editing area into a top view and displaying two indicators associated with movement motion editing at the robot model of the editing area.

Any one of the two indicators may be a front/rear movement motion editing indicator and the other one may be a rotating motion editing indicator.

The providing the robot motion event may include when the front/rear movement motion editing indicator is selected, calculating a moving distance according to a manipulation with respect to front/rear movement of the robot model and receiving a movement speed from a user; and providing a movement motion event rod including information about the moving distance and about a length corresponding to the movement time at the motion event track.

The receiving the movement speed may include displaying a before-movement location line and an after-movement location line of the robot model in the editing area and displaying a moving distance therebetween.

The providing the robot motion event may include: when the rotating motion editing indicator is selected, calculating a rotation angle according to a manipulation with respect to the rotation of the robot model and receiving a rotation speed from a user; and providing a movement motion event rod including information about the rotation angle and about a length corresponding to the rotation time at the motion event track.

The receiving the rotation speed may include displaying a before-rotation sight line and an after-rotation sight line of the robot model in the editing area and displaying a rotation angle therebetween.

After the providing the three-dimensional robot model, the method may further include: when a lamp expression editing mode is in operation, changing an image of the editing area into a front view and displaying at least one lamp location in the robot model of the editing area.

The providing the robot motion event may include receiving a selective input about the lamp location and color and time of the lamp; and providing a lamp expression event rod including information about the lamp location and the color and about a length corresponding to the received time provided on the motion event track.

The method may further include communicating with a tangible robot and synchronizing operation of the robot model with the tangible robot; and operating the robot model of the editing area according to an event provided on the motion event track.

The method may further include shifting the editing area into an emulation area in which the robot model operates in a virtual space, displaying a preview window for outputting a media, and shifting the motion event track into a content event track; providing a list of templates of a robot motion event and media templates; and expressing a robot motion event and a media selected from the list as an event rod having a length corresponding to a regeneration length of the corresponding robot motion event and media and providing the event rod at the content event track.

The method may further include operating the robot model of the emulation area according to the robot motion event provided on the content event track, regenerating the media provided on the content event track, and outputting the media to the preview window.

Exemplary embodiments provide for a general robot user, instead of a robot developer, a way to easily develop contents for a robot. Therefore, an educator or the like using a robot may develop and utilize various educational contents suitable for a learning curriculum.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Hereinafter, exemplary embodiments will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just examples for the purpose of illustrations only, not intended to limit the scope of the disclosure, so it should be understood that other equivalents and modifications could be made thereto without departing from the spirit and scope of the disclosure.

Figure 1:
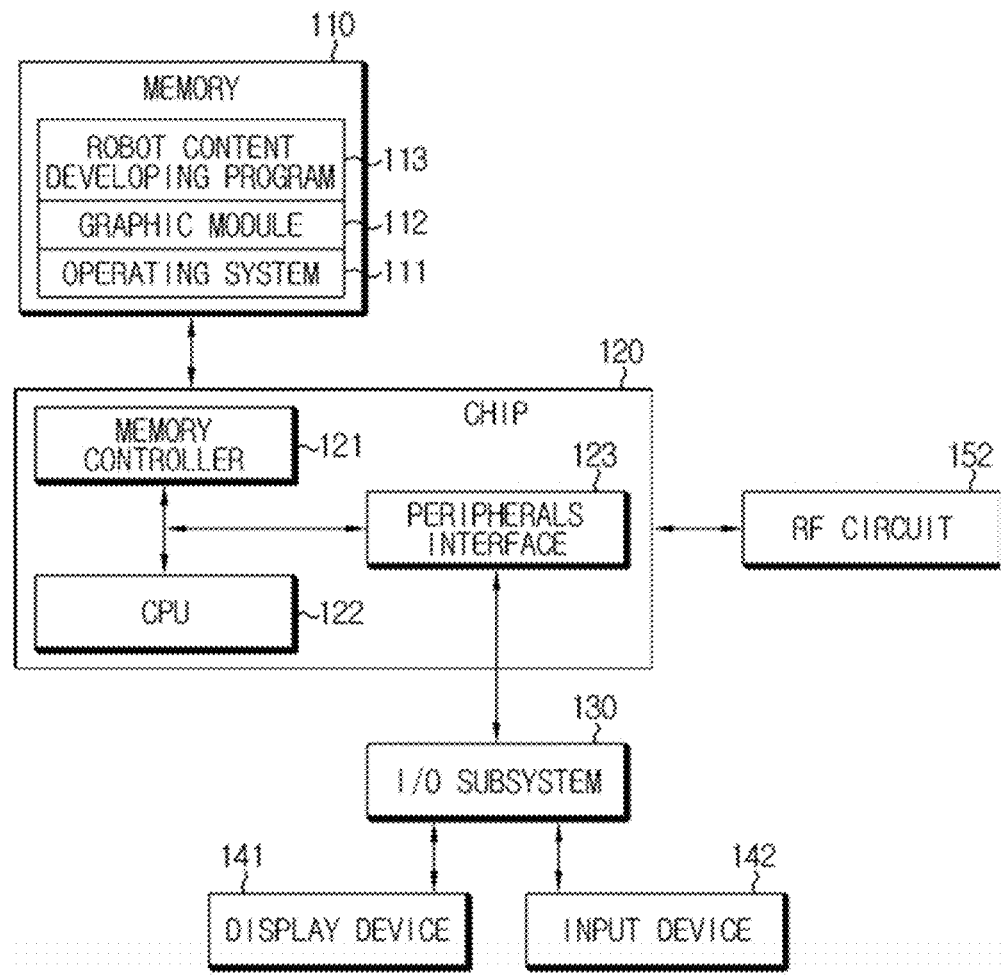
FIG. 1 is a block diagram illustrating an apparatus for developing robot contents according to an exemplary embodiment.

FIG. 1 is a block diagram illustrating an apparatus for developing robot contents (also referred to as a robot content developing apparatus) according to an exemplary embodiment;

Referring to FIG. 1, the robot content developing apparatus 100 includes a memory 110, a chip 120 which includes a memory controller 121, one or more processor (CPU) 122, and a peripherals interface 123, an input/output (I/O) subsystem 130, a display device 141, an input device 142 and an RF circuitry 152. These components communicate over one or more communication buses or signal lines.

The various exemplary components shown in FIG. 1 may be implemented in hardware, software, or a combination of hardware and software, including one or more signal processing and/or application specific integrated circuits.

The memory 110 may include a high speed random access memory and may also include non-volatile memory, such as one or more magnetic disk storage devices, flash memory devices, or other non-volatile solid state memory devices. In some exemplary embodiments, the memory 110 may further include storage remotely located from the one or more processors 122, for instance a network attached storage accessed via the RF circuitry 152 and a communications network (not shown) such as the Internet, intranet(s), Local Area Networks (LANs), Wide Local Area Networks (WLANs), Storage Area Networks (SANs) and the like, or any suitable combination thereof. Access to the memory 110 by other components of the robot content developing apparatus 100, such as the processor 122 and the peripherals interface 123, may be controlled by the memory controller 121.

The peripherals interface 123 couples the input/output peripherals of the robot content developing apparatus to the processor 122 and the memory 110. The one or more processor 122 run various software program and/or sets of instructions stored in the memory 110 to perform various functions for the robot content developing apparatus 100 and to process data.

In some exemplary embodiments, the peripherals interface 123, the processor 122 and the memory controller 121 may be implemented on a single chip, such as the chip 120. In some other exemplary embodiments, they may be implemented on separate chips.

The I/O subsystem 130 provides the interface between input/output peripherals on the robot content developing apparatus 100, such as the display device 141 and other input device 142, and the peripherals interface 123.

The display device 141 may use Liquid Crystal Display (LCD) techniques or Light-emitting Polymer Display (LPD) techniques, and this display device 141 may be a capacitive-type, resistive-type, or infrared-type touch screen. The touch screen provides both an output interface and an input interface between the robot content developing apparatus and a user. The touch screen displays visual output to the user. The visual output may include text, graphics, video, and any combination thereof. The visual output may entirely or partially correspond to a user interface object. The touch screen forms a touch-sensitive surface that accepts user input.

The processor 122 is configured to perform operations associated with the robot content developing apparatus 100 and execute instructions, and, for example, may control receiving and manipulating inputs and outputs among components of the robot content developing apparatus 100 by using instructions obtained from the memory 110.

In some exemplary embodiments, the software components include an operating system 111, a graphic module (or set of instructions) 112 and a robot content developing program (or set of instructions) 113, which are loaded (installed) in the memory 110.

The operating system 111 may be, for example, Darwin, RTXC, LINUX, UNIX, OS X, WINDOWS, or an embedded operating system such as VxWorks, includes various software components and/or drivers for controlling and managing general system tasks (e.g., memory management, storage device control, power management, etc.) and facilitates communication between various hardware and software components.

The graphic module 112 includes various well-known software components for rendering and displaying a graphic on the display device 141. The term "graphics" includes any object that can be displayed to a user, including without limitation text, web pages, icons (such as user-interface objects including soft keys), digital images, videos, animations, and the like.

The RF circuit 152 receives and sends electromagnetic waves. The RF circuit 152 converts electrical signals to/from electromagnetic waves and communicates with communications networks and other mobile gateways and communications devices via the electromagnetic waves. The RF circuit 152 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuit 152 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), voice over Internet Protocol (VoIP), Wi-MAX, Bluetooth, zigbee, Near Field Communication (NFC), a protocol for email, instant messaging, and/or Short Message Service (SMS), or any other suitable communication protocol, including communication protocols not yet developed as of the filing date of this document.

The robot content developing program 113 develops robot contents in association with the display device 141 and the input device 142. Exemplary embodiments of the robot content developing program will be described in detail below.

Figure 2:
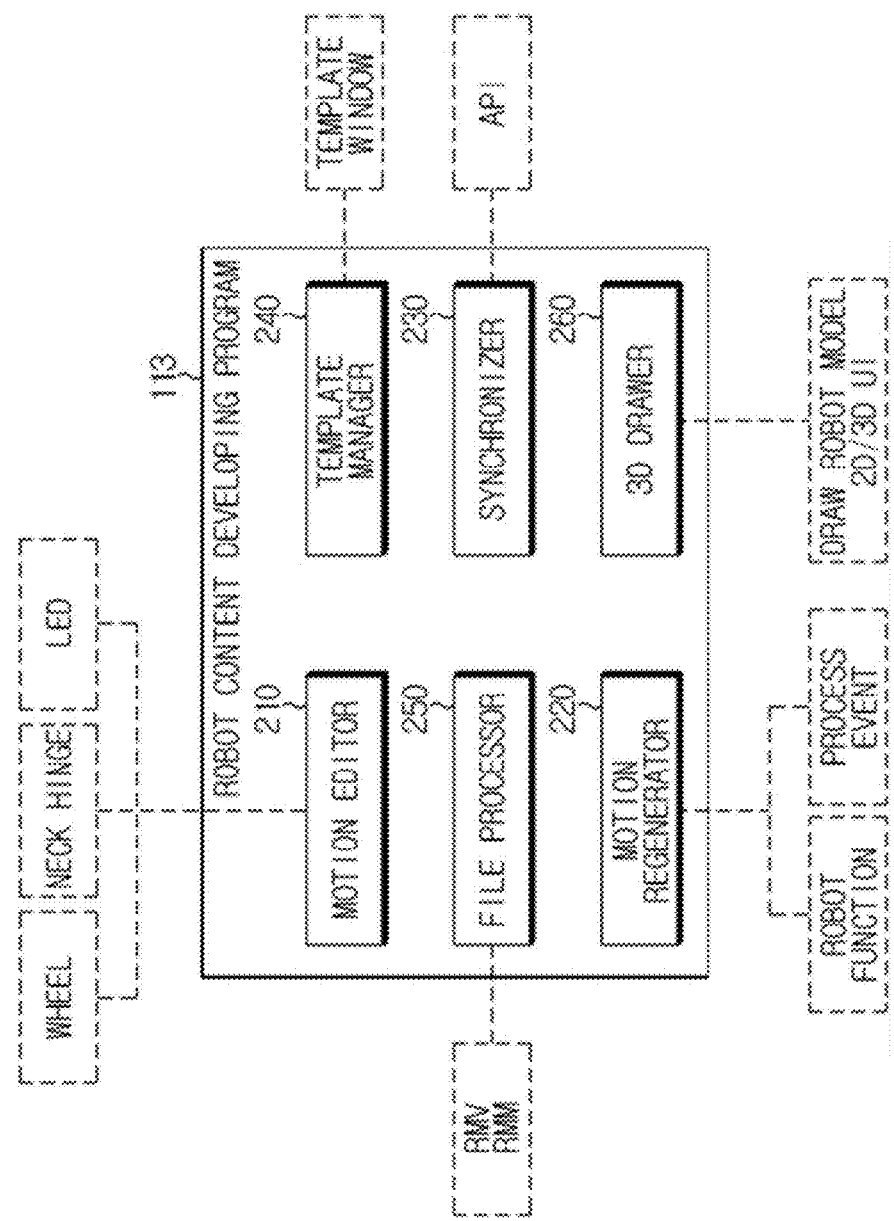
FIG. 2 is a block diagram illustrating a robot content developing program according to an exemplary embodiment.
Figure 3:
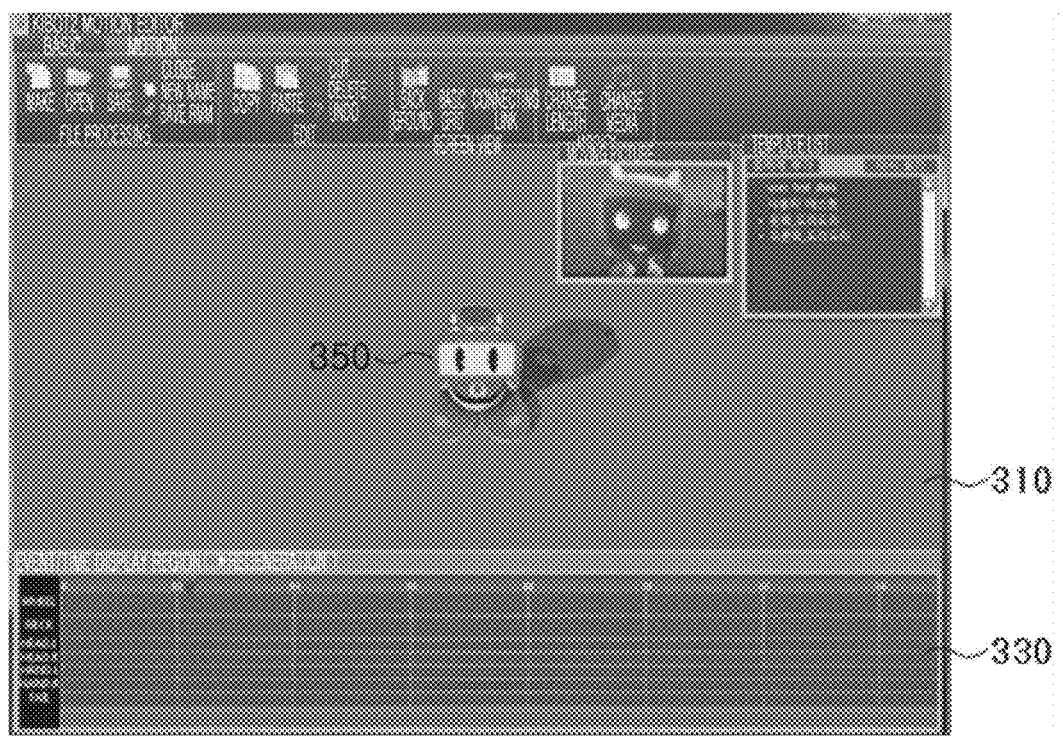
FIG. 3 is a view illustrating a basic interface image of the robot content developing program according to an exemplary embodiment of the present disclosure.

FIG. 2 is a view illustrating a robot content developing program according to an exemplary embodiment, and FIG. 3 is a view illustrating a basic interface image of the robot content developing program according to an exemplary embodiment.

As shown in FIG. 3, when operating, the robot content developing program displays an editing area 310 in which a robot model 350 is implemented so that a user may edit a motion by directly manipulating the robot model, a motion manipulated in the editing area 310, namely a head motion and movement motion, and a motion event track 330 where an event expressed by LED is shown according to time. When events shown in the motion event track 330 are regenerated, the robot model 350 implemented in the editing area 310 performs a motion according to the event at a designated time, for example turning the head, moving forward or rearward, or blinking the LED.

As shown in FIG. 2, the robot content developing program 113 includes a motion editor 210, a motion regenerator 220, a synchronizer 230, a template manager 240, a file processor 250 and a 3D drawer 260.

The 3D drawer 260 includes a 3D engine capable of expressing a robot function in a 3D space to express the editing area 310 as a virtual 3D space and express the 3D robot model 350 in the editing area 310. The 3D drawer 260 expresses a 2D or 3D effect and expresses a 2D or 3D User Interface (UI).

The motion editor 210 edits a series of operations, namely an animation, which operates LEDs, mounted to a neck hinge, wheels and a robot, in order, according to time, as a function of the robot.

The motion editor 210 gives three editing modes. Here, the three editing modes include a head motion editing, a movement motion editing and an LED expression editing. The motion editor 210 displays types of the editing modes in a menu tool so that a user may select a desired editing mode. In an exemplary embodiment, an editing mode may also be automatically selected if a user selects a name of an editing portion displayed at the motion event track 330.

Head Motion Editing

When a head motion editing mode is in operation, the motion editor 210 changes an image of the editing area 310 into a perspective view and displays an indicator at a neck portion of the robot model 350 displayed in the editing area 310. For example, a yellow circle is displayed at the neck portion of the robot model.

Figure 4:
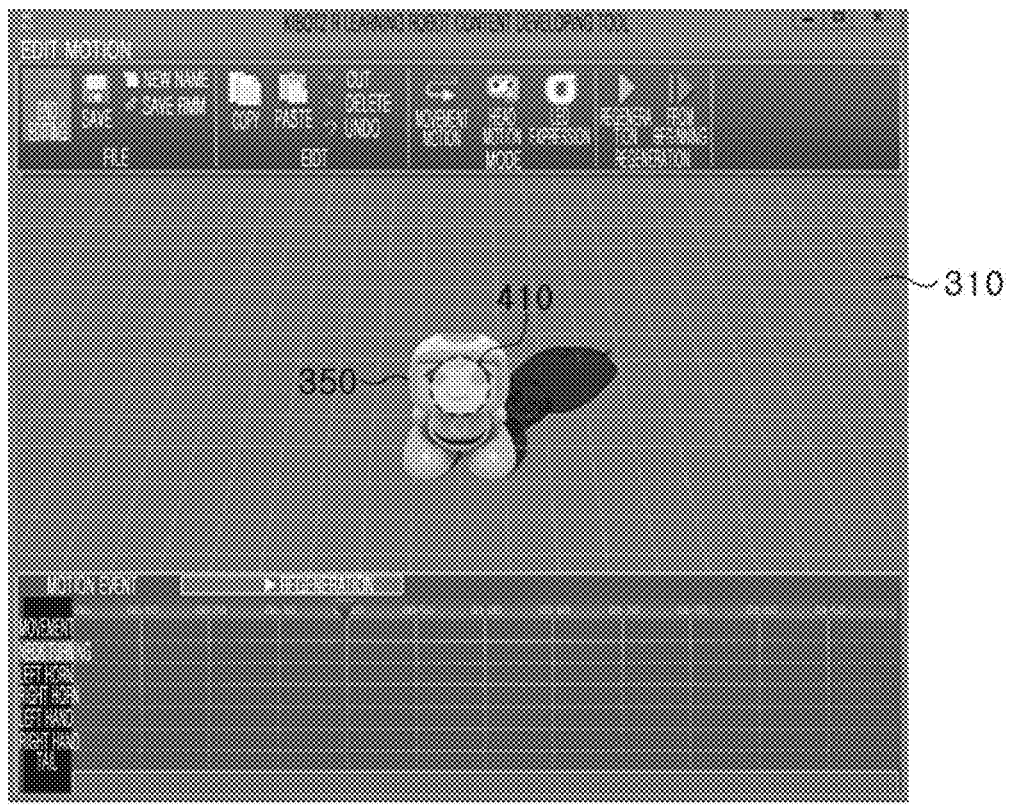
FIG. 4 is a view illustrating an image of a head motion editing mode according to an exemplary embodiment.

FIG. 4 is a view illustrating an image of the head motion editing mode according to an exemplary embodiment. As shown in FIG. 4, a circle 410 with a color is displayed at the neck portion of the robot model 350 displayed in the editing area 310 changed into a perspective view.

Figure 5:
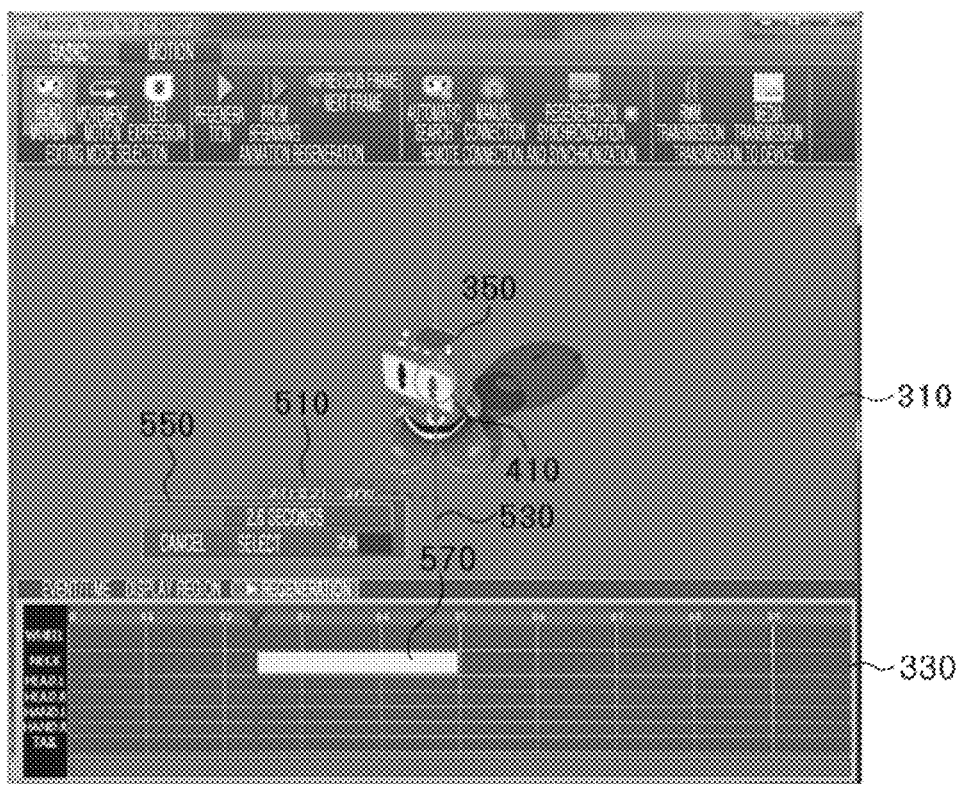
FIG. 5 is a view illustrating an image for explaining angle and time of a head motion according to an exemplary embodiment.

FIG. 5 is a view illustrating an image for explaining angle and time of a head motion according to an exemplary embodiment.

Referring to FIG. 5, the motion editor 210 displays a sight line 510 of the robot and a reference line 530 according to a location of the robot based on the indicator 410 displayed at the neck portion of the robot model 350 in the editing area 310 and allows a user to change and select an angle between the lines according to a mouse input. Preferably, 30 degrees in right and left directions based on the reference line 530 according to a location of the robot may be selected.

The motion editor 210 displays a window 550 in which time may be selected after an angle is set, and an actuation time of the head motion of the robot is input through the window 550. In other words, the time for actually moving by the angle selected by the user is input. The motion editor 210 displays and blinks an expected length at the motion event track 330 if the actuation time is input. In addition, if an additional input is received, the motion editor 210 adds an event 570 of the head motion having the set actuation time in a rod form at the motion event track 330.

Movement Motion Editing

When a movement motion editing mode is in operation, the motion editor 210 changes an image of the editing area 310 into a top view and displays two optional circles at the robot model 350 displayed in the editing area 310. One of the two circles plays a role of processing forward/rearward movement of the robot and the other circle plays a role of processing rotation of the robot.

Figure 6:
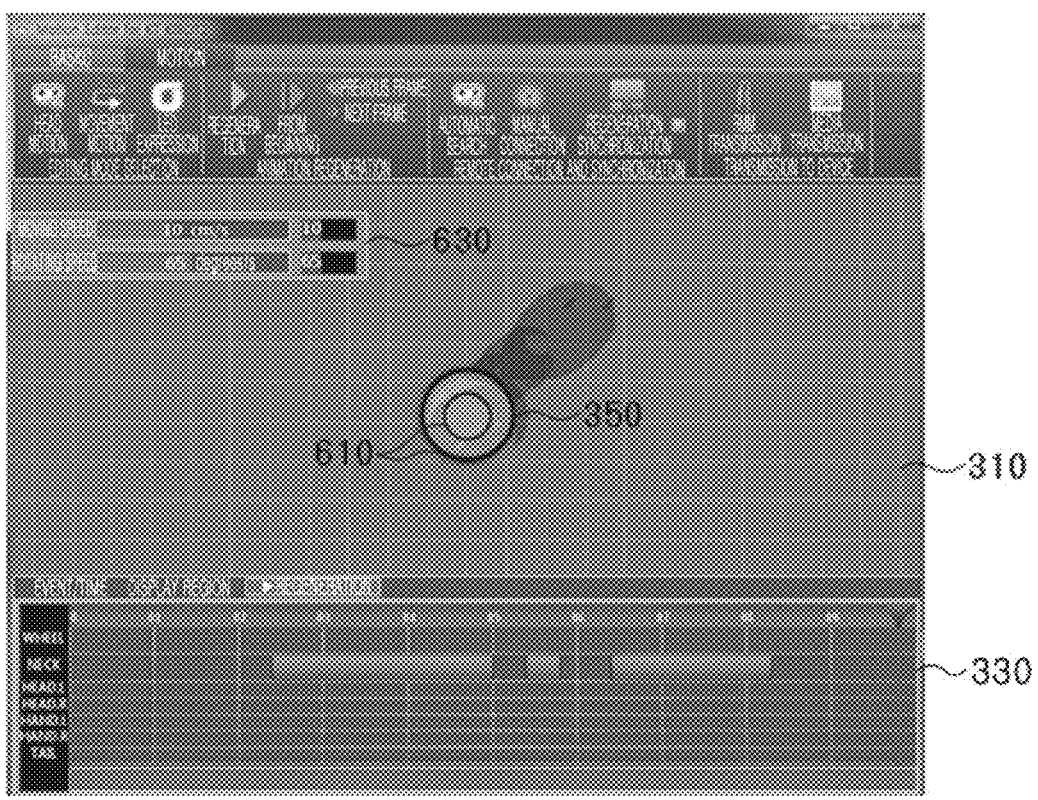
FIG. 6 is a view illustrating an image of a movement motion editing mode according to an exemplary embodiment.

FIG. 6 is a view illustrating an image of the movement motion editing mode according to an exemplary embodiment. The robot model 350 changed into a top view as shown in FIG. 6 and displayed in the editing area 310 is displayed as being observed from the above, and two circles 610 are displayed at the robot model.

The motion editor 210 outputs a speed setting window 630 in the editing area and receives a movement speed and a rotation speed of the moving robot from a user through the speed setting window 630. The movement speed is a value relating to forward/rearward movement and expressed with a unit of centimeter per second, which means a moving distance during 1 second. The rotation speed is a value relating to right rotation/left rotation and means an angular speed. The rotation speed may also be a rotation angle per second.

(1) Forward/Rearward Movement Editing

Figure 7:
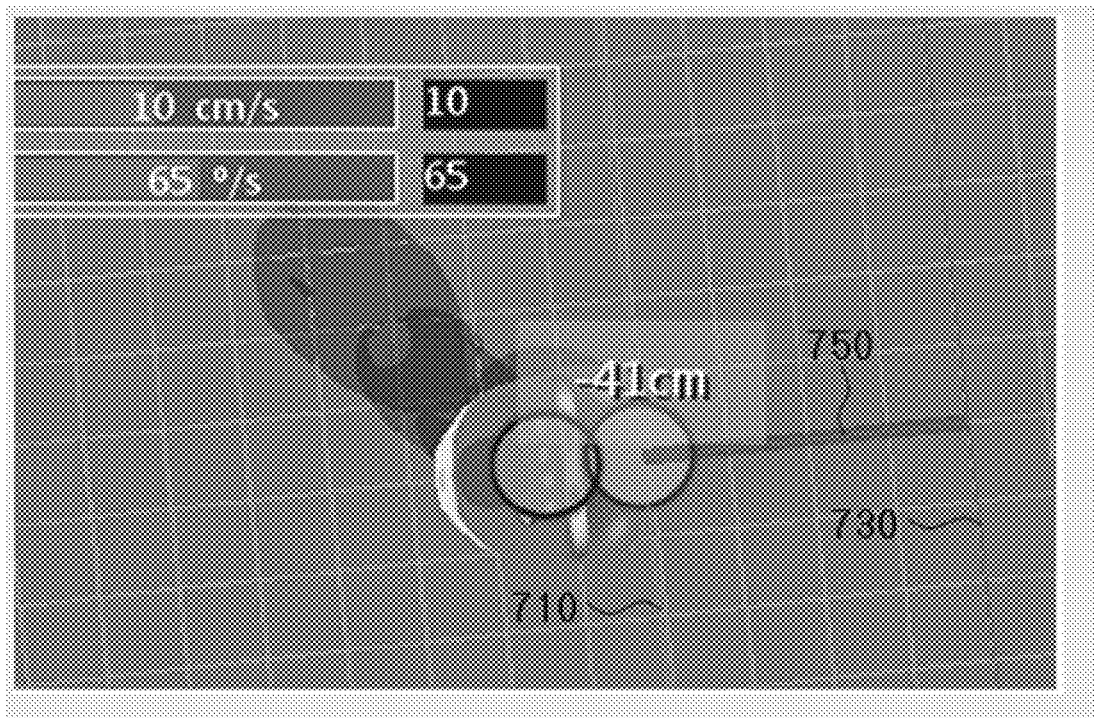
FIG. 7 is a view illustrating a location line before and after the robot model moves in the movement motion editing mode according to an exemplary embodiment.

The motion editor 210 receives a location of the motion event track 330 at which a forward/rearward movement motion event is added from a user. If the circle 610 associated with forward/rearward movement is selected by the user, the motion editor 210 starts editing the forward/rearward movement and moves the robot model 350 to the location selected by the user. As shown in FIG. 7, the motion editor 210 distinguishably displays a line 710 of an original location of the robot model and a line 730 after movement (for example, with different colors) and also displays a moving distance line 750 between them together with a distance value. In addition, if the circle 610 associated with forward/rearward movement is selected again by the user, the motion editor 210 blinks an expected movement time at the motion event track 330. If an additional input is received, an event of the set forward/rearward movement is added to the motion event track 330.

(2) Rotation Editing

Figure 8:
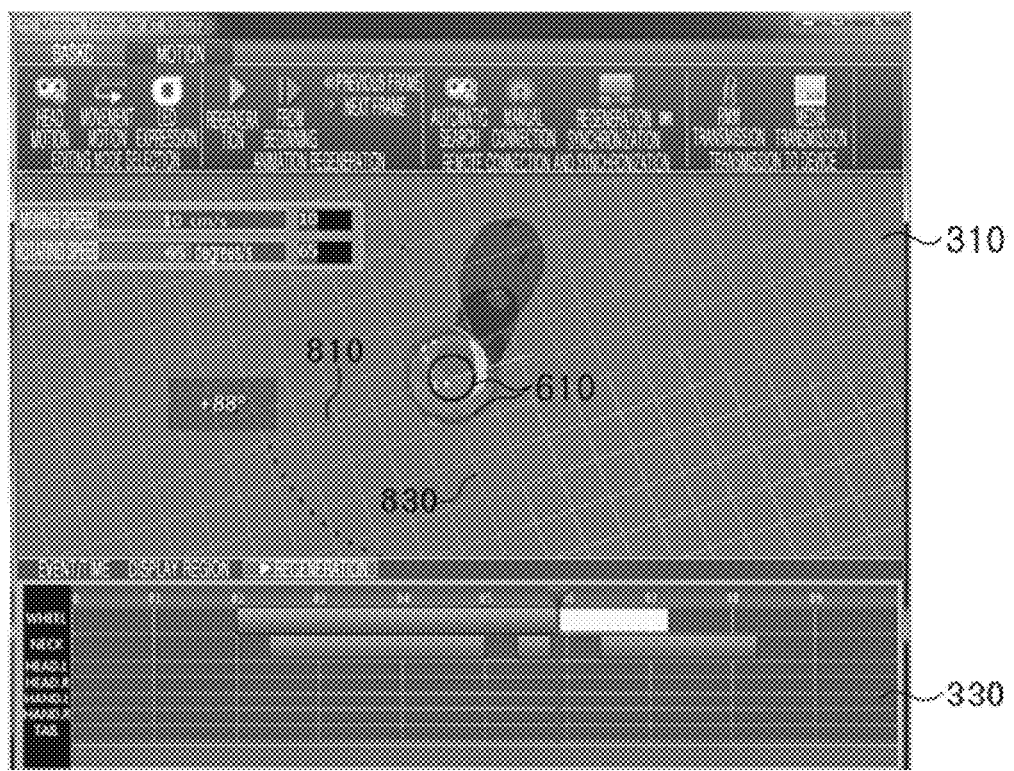
FIG. 8 is a view illustrating an image of a movement motion editing mode according to another exemplary embodiment.

FIG. 8 is a view illustrating an image of a movement motion editing mode according to another exemplary embodiment during rotation editing.

The motion editor 210 receives from the user a location of the motion event track 330 at which a rotating event will be added. If the circle 610 associated with rotation is selected by the user, the motion editor 210 starts a rotation editing operation and calculates a rotation value of the robot model 350 according to a moving location of the mouse of the user. The motion editor unit 210 displays a line 810 representing an original angle of the robot model 350 before the rotation and a line 830 representing an angle after rotation, displays a rotation angle, and also displays a rounded solid or dotted line between both lines.

If an angle is calculated based on an absolute location of the mouse of the user, the original angle of the robot model 350 before rotation may be expressed just within 180 degrees in the right and left directions based on the line 810. In addition, if an angle is calculated based on a relative location of the mouse, the rotation angle may be expressed by accumulating angles with relative right and left movement values of the mouse while a special key (for example, a shift key) is pressed.

If the circle 610 associated with the rotation is selected again by the user, the motion editor 210 displays and blinks an expected movement time at the motion event track 330. If an additional input is finally received, the set rotation event rod is added to the motion event track 330.

LED Expression Editing

Figure 9:
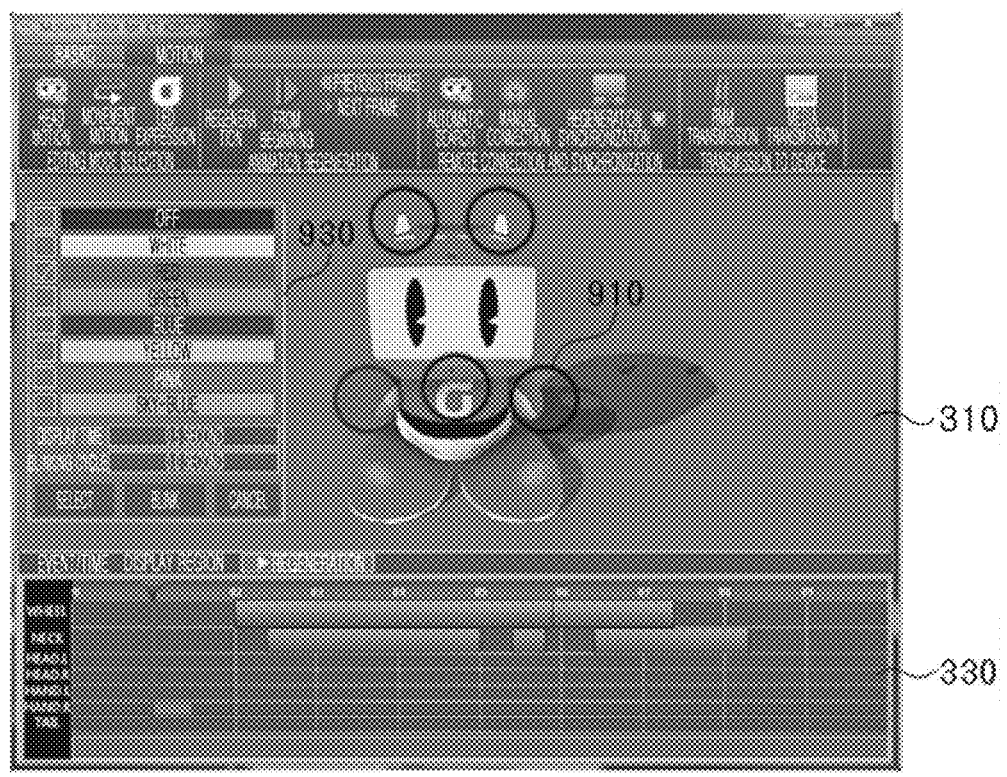
FIG. 9 is a view illustrating an image of an LED expression editing mode according to an exemplary embodiment.

When an LED expression editing mode is in operation, the motion editor 210 changes an image of the editing area 310 into a front view and displays an indicator, for example a circle, associated with an LED location at the robot model 350 displayed in the editing area 310. FIG. 9 is a view illustrating an image of an LED expression editing mode according to an exemplary embodiment. The image of the editing area 310 is changed into a front view, and an LED indicator 910 is displayed at the robot model 350. In FIG. 9, five circles are displayed as the LED indicator 910.

The motion editor 210 receives from the user a location from the motion event track 330 at which an LED expression event will be added. If one LED indicator 910 of the robot model 350 is selected by the user, the motion editor 210 displays a window 930 in which color and time may be set, and receives through the window 930 color of the LED and time during which the LED turns on. The motion editor 210 displays the LED indicator 910 with the color of the LED input by the user. If color and time are input, the motion editor 210 displays and blinks an expected length at the motion event track 330. In addition, if an additional input is finally received, an LED expression event rod having the set color and time is added to the motion event track 330.

If a regeneration input is received by the user after an event of a head motion, a movement motion or an LED motion of the robot is edited by the motion editor 210, the motion regenerator 220 regenerates the set event. In other words, the motion regenerator 220 starts regenerating from a point illustrated on the motion event track 330 selected by the user or from a start point and operates the robot model 350 in the editing area 310 according to the corresponding event at a point where the event of a head motion, a movement motion, or an LED expression is present.

The synchronizer 230 remotely connects to a physically real robot and synchronizes with the motion event of the robot generated by means of the motion editor 210. The synchronizer 230 gives an automatic connection or a manual connection.

When being automatically connected from a user, the synchronizer 230 searches robots remotely connectable and provides the list to the user, and remotely connects to a robot selected from the list. In addition, when being manually connected from a user, the synchronizer 230 displays an IP address input window, receives through the IP address input window an IP address of a robot which will be remotely connected, and connects to the robot by using the input IP address.

If an event for the robot is regenerated by the motion regenerator 220 or a specific event is selected and regenerated at the motion event track 330, the synchronizer 230 allows a real robot to operate while synchronizing with the robot model 350 in the editing area 310.

The template manager 240 stores a template in relation to a motion of the robot and makes the template into actual editing data. Here, the template is included, as a basic template, in the developing program as a file in relation to a motion of the robot and a user template made by the user by means of the developing program. If the user puts the motion file made through the motion editor 210 into a template directory, the template manager 240 manages the user template stored in the corresponding template directory and provides a list when the user requests.

The template manager 240 may display a template list including the basic template and the user template through a separate template window and add a template selected by the user into the motion event track 330. Preferably, when displaying the list of the basic template and the user template, the template manager 240 marks them distinguishably. For example, a symbol '+' may be added at the head of a name to distinguish the basic template from the user template.

The file processor 250 may generate a motion file by aggregating events generated by the motion editor 210 and transmit the motion file to an actual robot through the synchronizer 230. An extension of the motion file is rmm.

Figure 10:
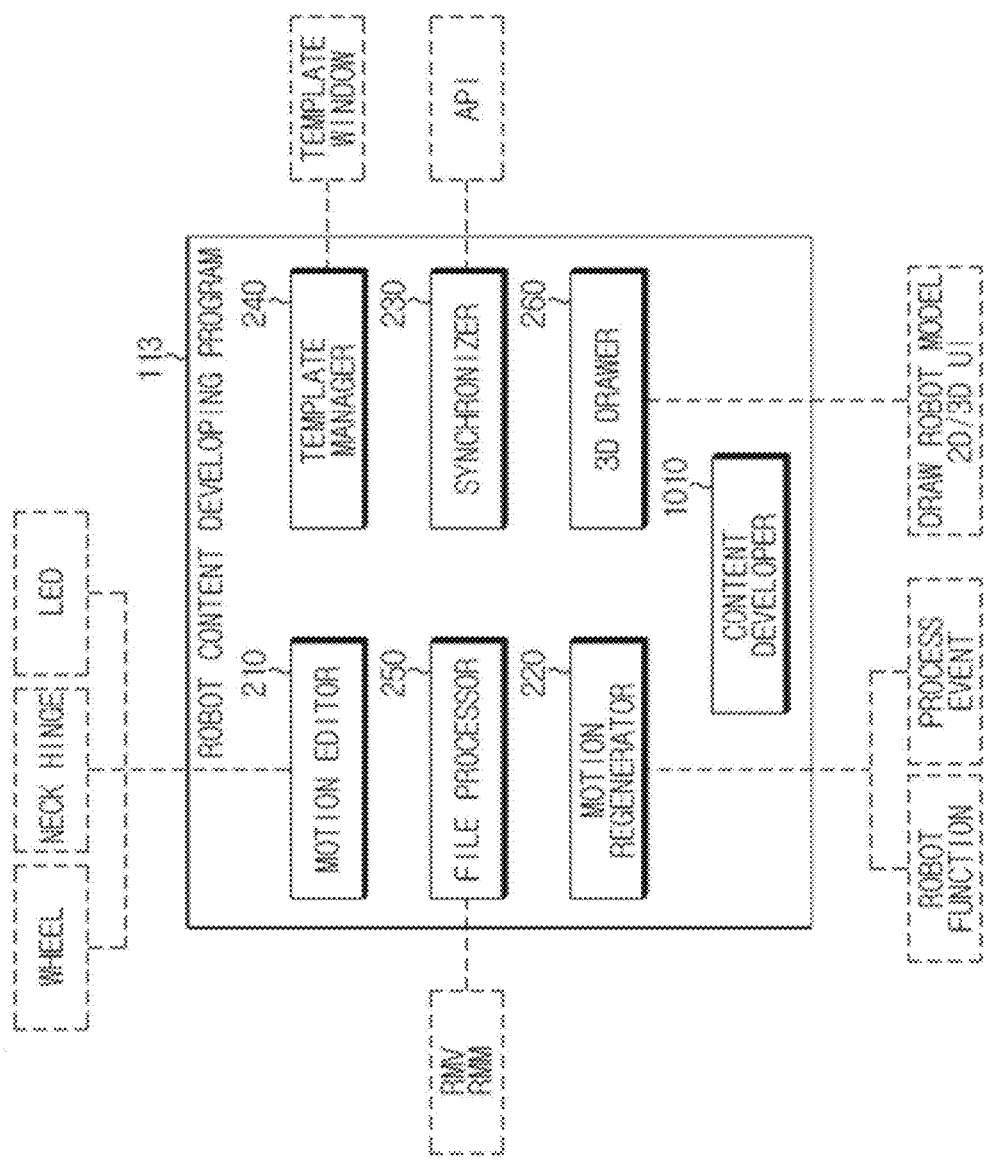
FIG. 10 is a block diagram illustrating a robot content developing program according to another exemplary embodiment.

FIG. 10 is a block diagram illustrating a robot content developing program according to another exemplary embodiment. In FIG. 10, a component designated by the same symbol as in FIG. 2 includes the same function and operation and is not described in detail here.

Referring to FIG. 10, the robot content developing program 113 of an exemplary embodiment further includes a content developer 1010. Here, the content has a concept of including a motion of a robot and a media synchronized with the motion of the robot. Therefore, regeneration of content by a robot indicates that the robot operates a motion according to a motion file and simultaneously regenerates a media synchronized with the motion, for example music, moving picture or the like. The robot content developing program 113 of an exemplary embodiment develops such content.

Figure 11:
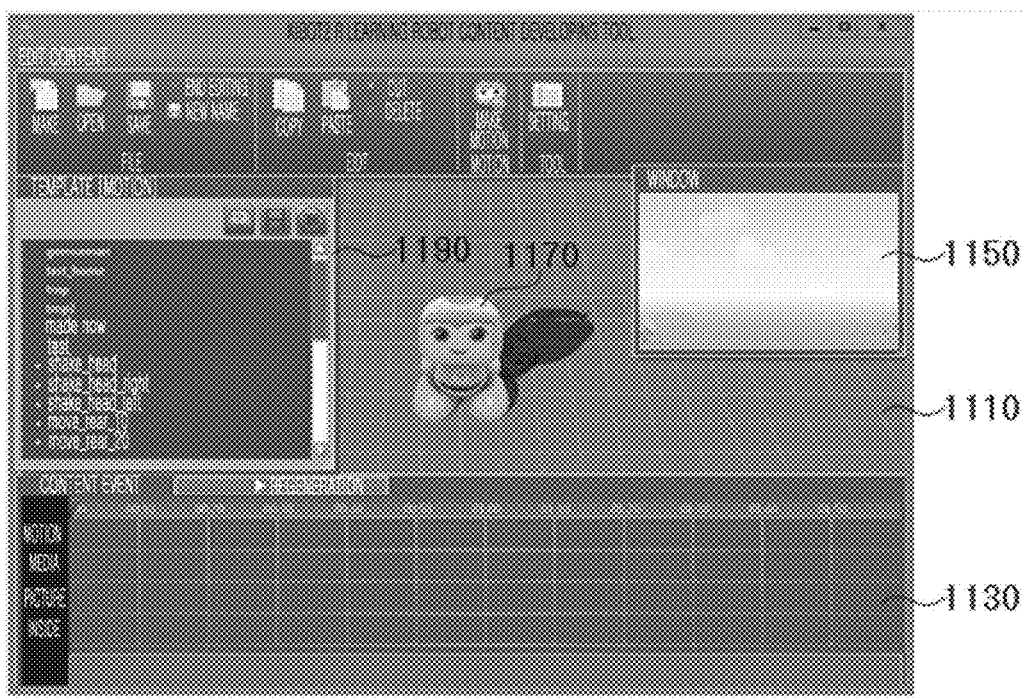
FIG. 11 is a view illustrating an image of a content editing mode according to an exemplary embodiment.

The robot content developing program 113 provides similar interfaces in a content editing mode and a motion editing mode. FIG. 11 is a view illustrating an image of the content editing mode according to an exemplary embodiment. As shown in FIG. 11, the robot content developing program 113 shifts a 3D editing area of the motion editing mode into an emulation area 1110 and shifts the motion event track into a content event track 1130. In addition, the robot content developing program 113 displays a preview window 1150.

The emulation area 1110 is a type of virtual space in which a robot model 1170 is displayed, and the robot model 1170 moves in the emulation area 1110 according to the motion event while initiating an operation of an actual robot. In the motion editing mode, the user edits a motion by directly manipulating the robot model 1170 in the editing area. Meanwhile, in the content editing mode, the user does not directly manipulate the robot model 1170 in the emulation area 1110, but the robot model 1170 in the emulation area 1110 just operates like an actual robot according to the motion event included in the content.

The content event track 1130 is similar to the motion event track 330 but has different components from the motion event track 330. The motion event track 330 arranges head events, movement events and LED expression events in relation to motions of the robot in a time order as components, but the content event track 1130 arranges motion events, media events and picture events as components. Here, the motion event includes all of head events, movement events, and LED expression events generated in the motion editing mode. The media includes a sound or image, and the picture includes a general static image.

The template manager 240 stores and manages not only a template in relation to a motion of the robot but also a template for the media. The template in relation to a motion of the robot is already described above according to an exemplary embodiment, and the template of the media includes a sound, image, or picture. The template manager 240 displays a motion template list in the template window 1190 or displays a media template list in the template window 1190, according to a selection by the user.

If the content developing and editing mode is selected by the user, the content developer 1010 activates the content event track 1130 and disposes the template selected by the user in the template window 1190 at the content event track 1130 in association with the template manager 240. The content developer 1010 disposes the template selected by the user at a corresponding item of the content event track 1130. In other words, the motion template is disposed at a motion track, the sound or image template is disposed at a media track, and the picture is disposed at a picture track.

At this time, the content developer 1010 provides an event at the track 1130 in a form of a rod corresponding to an actual regeneration length of the motion or the media. At this time, a start point of the corresponding event is selected by the user. In case of a sound or image having an absolute length, a rod is displayed as much as the corresponding length. However, in case of a picture having no length, the picture event is disposed with a length rod as much as a preset basic value.

The content developer 1010 may edit events provided at the content event track 1130. The content developer 1010 moves an event at the content event track 1130 in a right or left direction according to a drag-and-drop manipulation by the user and provides the event. In addition, the content developer 1010 adjusts a length of the event according to a drag-and-drop operation by the user with respect to an end of the content event track 1130.

If there is a regeneration input from the user after the event is provided at the content event track 1130, the content developer 1010 interprets the event provided at the content event track according to a time order to operate the robot model 1170 implemented in the emulation area 1110. In other words, the content developer 1010 turns the head of the robot model 1170, rotates or moves the robot model 1170 forwards/rearwards, or expresses LED, and if there is a synchronized sound, image or picture, the content developer 1010 outputs the sound, image or picture together with the motion of the robot model 1170. The image or picture may be displayed in the preview window 1150 or in the display area of the robot model 1170.

The file processor 250 generates a content file by aggregating events generated at the content developer 1010. Preferably, the motion file generated by the motion editor 210 and the motion file generated by the content developer 1010 have different extensions.

Figure 12:
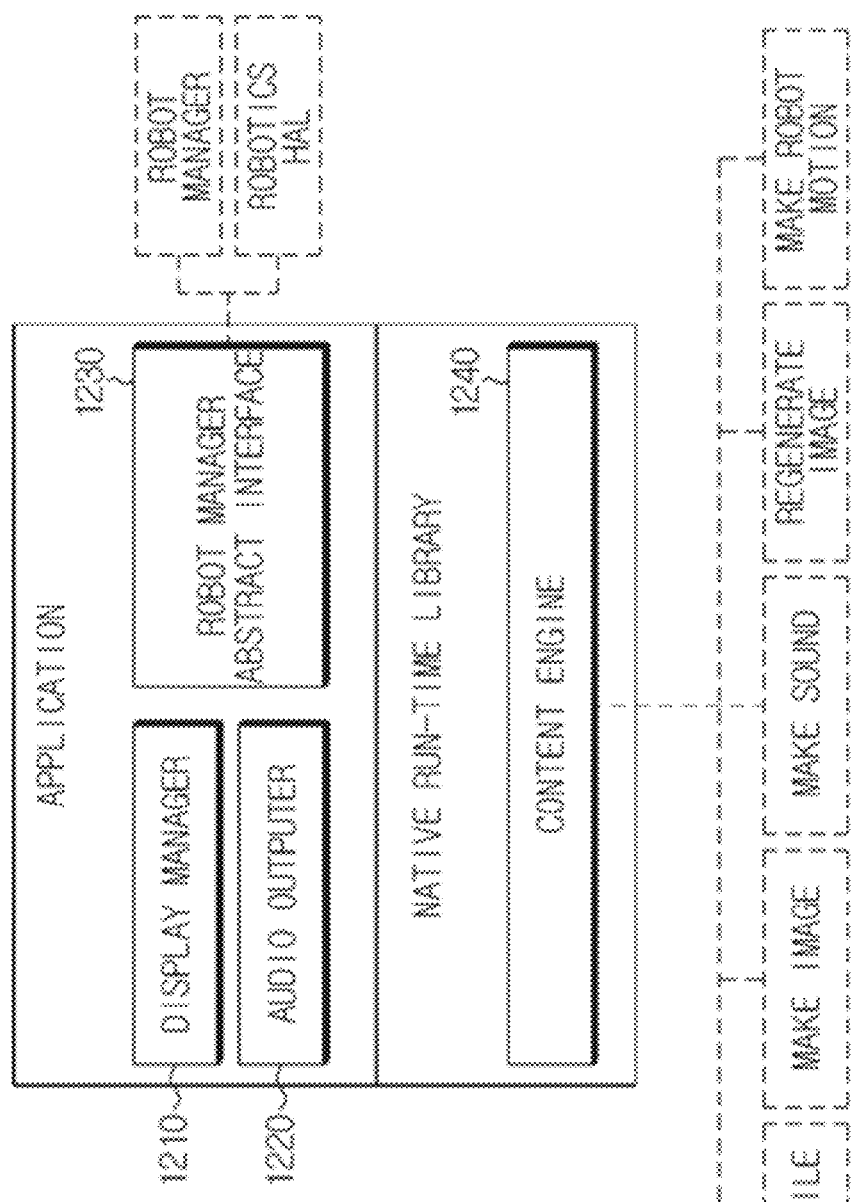
FIG. 12 is a block diagram illustrating a robot according to an exemplary embodiment.

FIG. 12 is a block diagram illustrating a robot according to an exemplary embodiment, which regenerates the robot contents developed by the robot content developing apparatus, for example as described above.

Referring to FIG. 12, the robot of an exemplary embodiment includes a display manager 1210, an audio outputter 1220, a robot manager abstract interface 1230 and a content engine 1240. Here, the display manager 1210, the audio outputter 1220 and the robot manager abstract interface 1230 are present in an application layer of the robot system, and the content engine 1240 is present in a framework native run-time library layer, according to an exemplary embodiment.

The display manager 1210 outputs an image processed by the content engine 1240 to a display device of the robot, and also makes a picture image processed by and sent from the content engine 1240 into a bitmap image and outputs the bitmap image to the display device. If the operating system installed in the robot is an Android system, the display manager 1210 makes an image by using an Android canvas.

The audio outputter 1220 transmits output audio data made at the content engine 1240 to an audio device such as a speaker and outputs the data.

The robot manager abstract interface 1230 is prepared by wrapping a robot manager (for example, an Android service)

loaded onto the operating system of the robot and converts information of robot contents into information necessary for the robot manager. The robot manager loaded onto the robot is not able to process complex data included in the robot contents and thus implements a separate robot manager abstract interface to convert information of the robot contents into information necessary for the robot manager.

If some functions of the motions included in the robot contents are supported by the robot manager, the robot manager abstract interface 1230 calls the robot manager for regenerating the motion. If some functions are not supported by the robot manager, a function in the robot driver, namely a robotics hardware abstract layer (HAL), is called to regenerate the motion.

The robot manager abstract interface 1230 includes a robotics control synchronization function for synchronization of the motion. Since the motion made by the content engine 1240 goes through an optimization process, a separate work is required for actually synchronizing motions, and the robot manager abstract interface 1230 synchronizes motions by using the robotics control synchronization function.

As shown by a dotted line in FIG. 12, the content engine 1240 functions to manage a robot contents file, makes an image from the robot contents file, makes a sound from the robot contents file, regenerates an image from the robot contents file, and makes a robot motion.

The content engine 1240 has a content reproduction function which allows a file to be processed in a managed java region, and also the content engine 1240 extracts a primitive image from the robot contents and transmits the image to the display manager 1210.

In addition, the content engine 1240 includes a codec which may process and regenerate an audio file such as WAV, MP3, OGG or the like, and also the content engine 1240 extracts an audio file from the robot contents, synchronizes a sound regenerated by the codec to make PCM data and transmits the data to the audio outputter 1220.

Moreover, the content engine 1240 includes an open source project library and an image codec for processing an image, and also the content engine 1240 extracts an image file from the robot contents, processing data made by the codec into an image according to synchronization logic, which may be actually regenerated, and transmits the image to the display manager 1210.

In addition, the content engine 1240 extracts a motion file from the robot contents, performs motion optimization, and then transmits the data to the robot manager abstract interface 1230. In other words, in order to process all motions included in the motion file like a single motion, the content engine 1240 blends all motions and optimizes intermediate portions which are connected or omitted.

Figure 13:
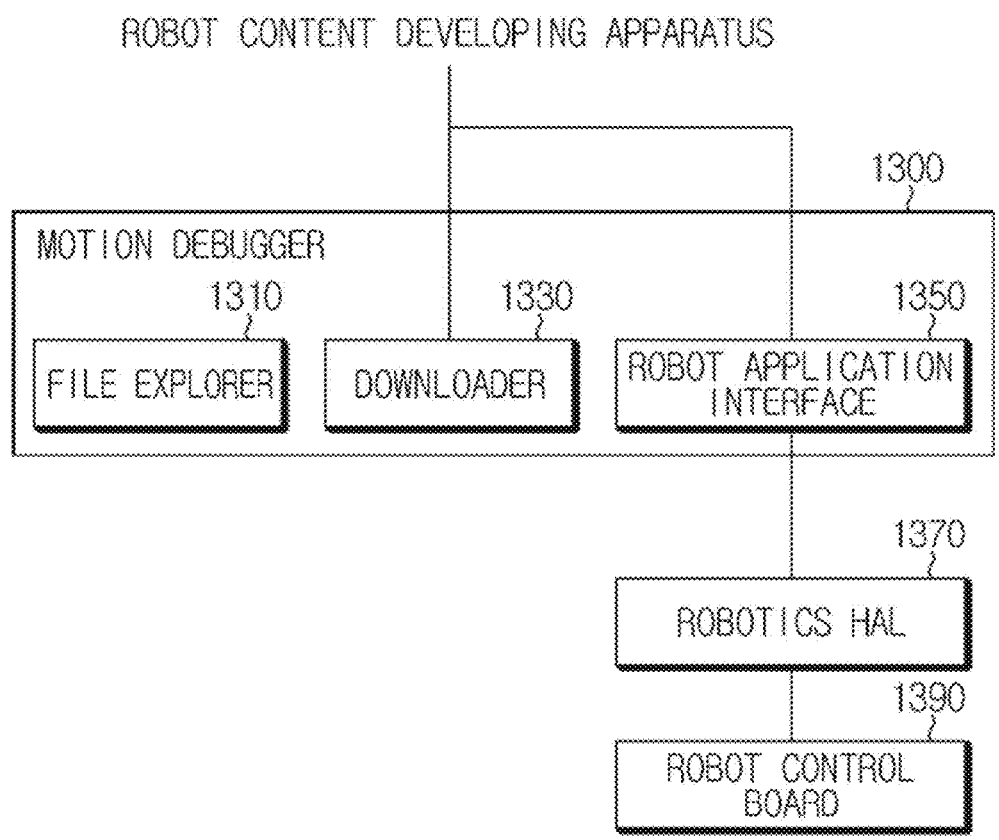
FIG. 13 is a block diagram illustrating a motion debugger according to an exemplary embodiment.

FIG. 13 is a block diagram illustrating a motion debugger according to an exemplary embodiment. The motion debugger 1300 is a middle-way i.e., a middle component, which communicates with the robot content developing apparatus to check a motion made by the robot content developing apparatus and process data, and the motion debugger 1300 is installed in the robot.

As shown in FIG. 13, the motion debugger 1300 includes a file explorer 1310, a downloader 1330 and a robot application interface 1350.

The file explorer 1310 manages a motion file stored in a memory of a robot. The downloader 1330 downloads the motion file made by the robot content developing apparatus and stores the motion file in the memory of the robot.

The robot application interface 1350 has a function of allowing the robot content developing apparatus to remotely control a function of the robot. In other words, the robot application interface 1350 plays a role of actually providing a debugging function.

The robot application interface 1350 controls performing a motion by calling the robotics hardware abstract layer (HAL) 1370 according to control data received from the robot content developing apparatus and displays movement information of the robot and a hardware state at the display device of the robot.

The robot application interface 1350 stops the function of the robot driver, namely the robotics hardware abstract layer, when the debugger operates, and converts the robot to be operated only by the robot content developing apparatus remotely connected.

The robot application interface 1350 transmits the control data received from the robot content developing apparatus to the robotics hardware abstract layer (HAL) 1370 installed at the robot and synchronizes the robot content developing apparatus and the robotics hardware abstract layer 1370 to perform the same processing at the same time. Preferably, the robot application interface 1350 employs a synchronization technique using a time-sharing skill.

Preferably, the robot application interface 1350 controls a motion of the robot in a frame unit (about 0.5 second). The robotics hardware abstract layer 1370 controls the robot control board 1390 according to the control data to operate a motion of the robot.

The method of exemplary embodiments described above may be implemented as a program and stored in a recording medium (CD-ROM, RAM, ROM, floppy disc, hard disc, magneto-optical disc or the like) in a computer-readable form.

While this specification contains many specifics, these should not be construed as limitations on the scope of the disclosure or on what may be claimed, but rather as descriptions of features that may be specific to various exemplary embodiments. Certain features that are described in the context of separate exemplary embodiments may also be implemented in combination in a single exemplary embodiment. Conversely, various features that are described in the context of a single exemplary embodiment may also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that exemplary embodiments do not require the distinction of various system components made in the disclosure. The program components and systems may be generally implemented as a single software product or multiple software product packages.

It will be understood by those skilled in the art that various changes and modifications may be made without changing a technical conception and/or any essential features of exemplary embodiments. Thus, above-described exemplary embodiments are exemplary in all aspects, and do not limit the present disclosure. The scope of the present disclosure is defined by the following claims and their equivalents rather than by the detailed description of exemplary embodiments. It shall be understood that all modifications and embodiments conceived from the meaning and scope of the claims and their equivalents are included in the scope of the present disclosure

What is claimed is:

1. An apparatus for developing robot contents, the apparatus comprising:
   a drawer configured to implement and provide a three-dimensional robot model in an editing area of an interface for developing the robot contents; and
   a motion editor configured to generate a robot motion event according to a motional manipulation input directly upon the robot model of the editing area and configured to provide the robot motion event at a motion event track of the interface according to time, wherein
   the motion editor is further configured to calculate a head motion angle according to a manipulation with respect to a head of the robot model, configured to receive an actuation time from a user, and configured to provide a head motion event rod comprising information about the head motion angle and about a length corresponding to the actuation time provided on the motion event track, and
   the motion editor is further configured to display a reference line according to a location of the robot model and a sight line of the robot model, and configured to calculate an angle between the sight line and the reference line as a head motion angle.

2. The apparatus for developing robot contents according to claim 1, wherein the motion editor is configured to display an indicator at a neck-hinge portion of the robot model, and configured to display the reference line and the sight line when the indicator is selectively input.

3. The apparatus for developing robot contents according to claim 2, wherein the motion editor is configured to change an image of the editing area into a perspective view when the head motion editing mode is in operation.

4. The apparatus for developing robot contents according to claim 1, wherein the motion editor is configured to change an image of the editing area into a top view when a movement motion editing mode is in operation, and is configured to display two indicators associated with movement motion editing at the robot model of the editing area.

5. The apparatus for developing robot contents according to claim 4, wherein a first indicator of the two indicators is a front movement motion and rear movement motion editing indicator and a second indicator of the two indicators is a rotating motion editing indicator.

6. The apparatus for developing robot contents according to claim 5, wherein when the first indicator is selected, the motion editor is configured to calculate a moving distance according to a manipulation with respect to at least one of front movement and rear movement of the robot model, is configured to receive a movement speed from the user, and is configured to provide a movement motion event rod comprising information about moving distance and about a length corresponding to movement time provided on the motion event track.

7. The apparatus for developing robot contents according to claim 6, wherein the motion editor is configured to display a before-movement location line and an after-movement location line of the robot model in the editing area, and is configured to display a moving distance therebetween.

8. The apparatus for developing robot contents according to claim 5, wherein when the rotating motion editing indicator is selected, the motion editor is configured to calculate a rotation angle according to a manipulation with respect to rotation of the robot model, is configured to receive a rotation speed from the user, and is configured to provide a movement motion event rod comprising information about the rotation angle and about a length corresponding to rotation time provided on the motion event track.

9. The apparatus for developing robot contents according to claim 8, wherein the motion editor is configured to display a before-rotation sight line and an after-rotation sight line of the robot model in the editing area, and is configured to display a rotation angle therebetween.

10. The apparatus for developing robot contents according to claim 1, wherein the motion editor is configured to change an image of the editing area into a front view when a lamp expression editing mode is in operation, and is configured to display at least one lamp location in the robot model of the editing area.

11. The apparatus for developing robot contents according to claim 10, wherein the motion editor is configured to receive a selective input about the lamp location, color, and time of the lamp, and is configured to provide a lamp expression event rod including information about the lamp location and the color and about a length corresponding to the received time provided on the motion event track.

12. The apparatus for developing robot contents according to claim 1, further comprising:
    a motion regenerator configured to operate the robot model of the editing area according to an event provided at the motion event track; and
    a synchronizer configured to communicate with a tangible robot and synchronizing operation of the robot model with the tangible robot.

13. The apparatus for developing robot contents according to claim 1,
    wherein in a content editing mode, the editing area is shifted into an emulation area in which the robot model operates only in a virtual space, a preview window which shows a media is displayed, and the motion event track is shifted into a content event track,
    wherein the apparatus further comprises:
    a template manager configured to store a template of a robot motion event generated by the motion editor and a media template and which is configured to provide a list thereof; and
    a content developer which is configured to express a robot motion event and a media selected from the list provided by the template manager as an event rod having a length corresponding to a regeneration length of the corresponding robot motion event and media and providing the event rod at the content event track.

14. The apparatus for developing robot contents according to claim 13, wherein when receiving a regeneration input, the content developer is configured to operate the robot model of the emulation area according to the robot motion event provided at the content event track, is configured to regenerate the media provided at the content event track, and is configured to output the media to the preview window.

15. The apparatus for developing robot contents according to claim 13, wherein the motion editor is further configured to generate the robot motion event according to a head motion editing mode, a movement motion editing mode, a rotation editing mode and a LED expression mode, wherein:
    in the head motion editing mode, the robot model is displayed from a perspective view in the editing area,
    in the movement motion editing mode and rotation editing mode, the robot model is displayed from a top view in the editing area, and in the LED expression mode, the robot model is displayed from a front view.

16. The apparatus for developing robot contents according to claim 13, wherein the drawer is further configured to display movements of the robot model according to the robot motion event generated by the motion editor.

17. A method for developing robot contents in a robot content developing apparatus, the method comprising:
outputting, by a processor, an interface comprising an editing area and a motion event track;
implementing and providing, by the processor, a three-dimensional robot model in the editing area;
generating, by the processor, a robot motion event according to a motional manipulation input directly upon the robot model; and
providing the robot motion event at the motion event track according to time, wherein said providing the robot motion event further comprises:
calculating a head motion angle according to a manipulation with respect to a head of the robot model and receiving an actuation time; and
providing a head motion event rod comprising information about the head motion angle and about a length corresponding to the actuation time provided on the motion event track; and
wherein said receiving the actuation time comprises:
displaying a reference line according to a location of the robot model and a sight line of the robot model; and
calculating an angle between the sight line and the reference line as a head motion angle.

18. The method for developing robot contents according to claim 17, wherein said displaying a reference line comprises:
displaying an indicator at a neck-hinge portion of the robot model; and
displaying the reference line and the sight line when the indicator is selectively input.

19. The method for developing robot contents according to claim 18, further comprising:
changing an image of the editing area into a perspective view.

20. The method for developing robot contents according to claim 17, wherein, after said implementing and providing the three-dimensional robot model,
changing an image of the editing area into a top view and displaying two indicators associated with movement motion editing of the robot model in the editing area.

21. The method for developing robot contents according to claim 20, wherein a first indicator of the two indicators is a front movement motion and rear movement motion editing indicator and a second indicator of the two indicators is a rotating motion editing indicator.

22. The method for developing robot contents according to claim 21, wherein said providing the robot motion event comprises:
when the front movement motion and rear movement motion editing indicator is selected, calculating a moving distance according to a manipulation with respect to at least one of front movement and rear movement of the robot model and receiving a movement speed from a user; and
providing a movement motion event rod comprising information about the moving distance and about a length corresponding to the movement time provided on the motion event track.

23. The method for developing robot contents according to claim 22, wherein said receiving the movement speed comprises:
displaying a before-movement location line and an after-movement location line of the robot model in the editing area and displaying a moving distance therebetween.

24. The method for developing robot contents according to claim 21, wherein said providing the robot motion event comprises:
when the rotating motion editing indicator is selected, calculating a rotation angle according to a manipulation with respect to rotation of the robot model and receiving a rotation speed from a user; and
providing a movement motion event rod comprising information about the rotation angle and about a length corresponding to the rotation time providing on the motion event track.

25. The method for developing robot contents according to claim 24, wherein said receiving the rotation speed comprises:
displaying a before-rotation sight line and an after-rotation sight line of the robot model in the editing area and displaying a rotation angle therebetween.

26. The method for developing robot contents according to claim 17, after said implementing and providing the three-dimensional robot model, further comprising:
when a lamp expression editing mode is in operation, changing an image of the editing area into a front view and displaying at least one lamp location in the robot model of the editing area.

27. The method for developing robot contents according to claim 26, wherein the providing the robot motion event comprises:
receiving a selective input about the lamp location and color and time of the lamp; and
providing a lamp expression event rod comprising information about the lamp location and the color and about a length corresponding to the received time provided on the motion event track.

28. The method for developing robot contents according to claim 17, further comprising:
communicating with a tangible robot and synchronizing operation of the robot model with the tangible robot; and
operating the robot model of the editing area according to an event provided on the motion event track.

29. The method for developing robot contents according to claim 17, further comprising:
shifting the editing area into an emulation area in which the robot model operates in a virtual space, displaying a preview window for outputting a media, and shifting the motion event track into a content event track;
providing a list of templates of a robot motion event and media templates; and
expressing a robot motion event and a media selected from the list as an event rod having a length corresponding to a regeneration length of the corresponding robot motion event and media and providing the event rod at the content event track.

30. The method for developing robot contents according to claim 29, further comprising:
operating the robot model of the emulation area according to the robot motion event provided at the content event track, regenerating the media provided on the content event track, and outputting the media to the preview window.

31. The method for developing robot contents according to claim 17, further comprising:
- selecting at least one robot model from a list of robot models representing tangible robots;
- generating at least one motion for the selected robot model;
- linking media contents to the selected robot model at a respective time point in operation of the selected robot model, said media comprising at least one of a sound, an image, and a video; and
- loading said at least one motion and the media contents forming an executable file to a tangible robot corresponding to the selected robot model for execution.

32. An apparatus for developing robot contents, the apparatus comprising:
- a drawer configured to implement and provide a three-dimensional robot model in an editing area of an interface for developing the robot contents; and
- a motion editor configured to generate a robot motion event according to a motional manipulation with respect to the robot model of the editing area and configured to provide the robot motion event at a motion event track of the interface according to time, wherein
- the motion editor is configured to calculate a head motion angle according to a manipulation with respect to a head of the robot model, configured to receive an actuation time from a user, and configured to provide a head motion event rod comprising information about the head motion angle and about a length corresponding to the actuation time provided on the motion event track, and
- the motion editor is configured to display a reference line according to a location of the robot model and a sight line of the robot model, and configured to calculate an angle between the sight line and the reference line as a head motion angle.

33. An apparatus for developing robot contents, the apparatus comprising:
- a drawer configured to implement and provide a three-dimensional robot model in an editing area of an interface for developing the robot contents; and
- a motion editor configured to generate a robot motion event according to a motional manipulation with respect to the robot model of the editing area and configured to provide the robot motion event at a motion event track of the interface according to time, wherein
- the motion editor is configured to change an image of the editing area into a top view when a movement motion editing mode is in operation, and is configured to display two indicators associated with movement motion editing directly on the robot model of the editing area
- a first indicator of the two indicators is a front movement motion and rear movement motion editing indicator and a second indicator of the two indicators is a rotating motion editing indicator, and
- when the first indicator is selected, the motion editor is configured to calculate a moving distance according to a manipulation with respect to at least one of front movement and rear movement of the robot model, is configured to receive a movement speed from the user, and is configured to provide a movement motion event rod comprising information about moving distance and about a length corresponding to movement time provided on the motion event track,
- wherein the motion editor is further configured to display a before-movement location line and an after-movement location line of the robot model in the editing area, and is configured to display a moving distance therebetween.

* * * * *